Jan. 31, 1961     E. B. RUTTGERS     2,970,018
BALL BEARING CLAMPING STRUCTURE
Filed July 14, 1958
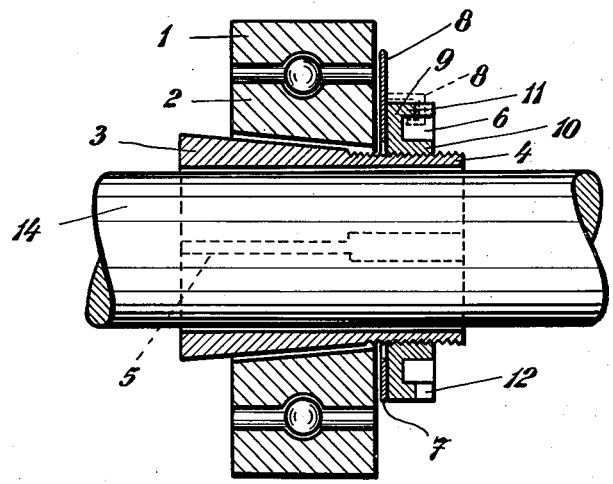
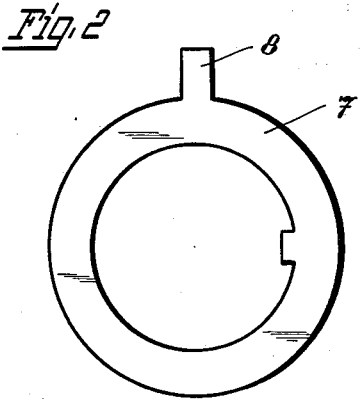 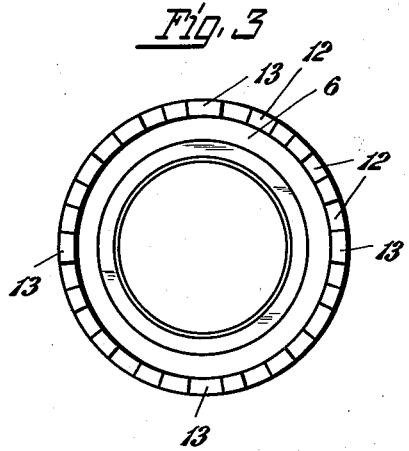
INVENTOR:
ERNESTO B. RUTTGERS
BY
Richardson, David and Nordon
ATTORNEYS.

United States Patent Office 2,970,018
Patented Jan. 31, 1961

2,970,018
BALL BEARING CLAMPING STRUCTURE

Ernesto B. Ruttgers, El Espino 1267 (Por Vitacura), Santiago, Chile

Filed July 14, 1958, Ser. No. 748,418

Claims priority, application Germany July 16, 1957

1 Claim. (Cl. 308—236)

Ball bearings of known type are frequently provided with clamping sleeve, clamping nut and securing ring, so that the ball bearing may be clamped fast on a rotating shaft. In this case the clamping nut consists of a solid nut of the ordinary type, having a series of detents on the periphery. The securing ring surrounds this nut with a rim, and after tightening of the nut is pressed into the nut in the region of the detents, namely at a plurality of points, in order to secure.

In another known form of embodiment the securing ring is provided with a radial lug, which is bent into one of the peripheral recesses of the nut, after the nut has been tightened.

In all cases the nut requires swarf-removing working for its production, since the peripheral grooves cannot be produced by stamping or pressing. Furthermore in the case of the first-mentioned form of embodiment the securing is not adequate, for the bent portions of the peripheral flange of the securing ring, extending into the grooves, can be bent out again if a slight torque is present.

In no case will the solid nut possess a parallel position in relation to the end face of the ball bearing. Consequently on tightening of the nut, distortions can easily occur, which render the satisfactory running of the ball bearing no longer sure. Furthermore the bending of a radial lug into a peripheral groove of the clamping nut does not offer complete security. Some circumstances can cause bending out.

Finally the peripheral detents of the nut render the screwing on thereof more difficult, for the detents must be sharp-edged, in order to make escape of the bent-in lug of the securing ring more difficult.

The present invention takes this into account, due to the fact that the clamping nut consists of a ring of U-shaped cross-section, the back of which faces the securing ring, and possesses the threading on the inside of the inner flange. The detents for the bending in of a radial lug of the securing ring, and the notches for the application of a toool serving for the rotation, are arranged on the free end edge of the external flange.

Thus firstly the object is achieved that the nut can be produced by stamping or pressing. The provision of a plurality of detents offers no difficulties. Swarf-removing working is not necessary. As a result of the U-shaped cross-section of the nut the latter is elastic, and will consequently automatically assume a parallel position when bearing against the end of the ball bearing, without causing jamming of the ball bearing. The external periphery of the nut is not notched. Thus screwing on is facilitated. The securing ring can be angled off twice, a circumstance which signifies increased security.

The accompanying drawing shows a form of embodiment of the ball bearing according to the invention, with clamping sleeve.

Figure 1 shows the ball bearing with clamping sleeve, clamped fast on a shaft, in section, Figure 2 shows an end view of the securing ring, Figure 3 shows an end view of the clamping nut.

The ball bearing, consisting of the outer ring 1 and the inner ring 2, is clamped fast on a shaft 14. For this purpose the inner ring 2 of the ball bearing is made conical on the inner side, and is mounted on the conical part 3 of a clamping sleeve, which has an end extension 4 on the side with smaller radius. The extension 4 is provided with external threading. The extension 4 and the sleeve 3 are provided with a continuous longitudinal slot 5.

Between the ball bearing 1, 2 and a clamping nut 6 mounted on the external threading of the cylindrical extension 4 there is arranged the pliable metal securing ring 7 of the nut, which has a single, outer radially projecting, lug 8 and an inner short radial lug which engages in slot 5 of the sleeve extension 3.

The clamping nut 6 is made U-shaped in cross-section, namely in such fashion that the back 9 faces the securing ring 7 and the inner flange 10 of the ring carries the threading on its inner periphery. The free end face of the outer flange 11 carries detents 12 distributed over its entire periphery. Between the detents there are notches 13 of greater dimensions, at equal angular distances, which are intended for the application of the tool serving for the tightening of the nut.

Before clamping fast, the nut must be screwed on to the threading of the cylindrical part 4. This is effected by hand, and can easily take place without injury, since the nut is made smooth on its external periphery, that is to say on the periphery of its outer flange 11. When the nut 6 has closed with the securing ring 7, tightening is effected with the tool which is applied to the notches 13. The lug 8 can not be damaged by this tool, because the detents 12 on the end of the flange 11 spaces the tool away from the securing ring. When the nut 6 has been tightened sufficiently, the lug 8 is bent into one of the detents 12, as shown in dotted lines in the drawing, and the nut is secured against rotation. At the same time the ball bearing 1, 2 is clamped fast on the shaft 14 through the conical sleeve 3. The nut is yieldable, so that distortions cannot occur so easily.

I claim:

A ball bearing structure comprising an inner race and an outer race between which balls are supported, said inner race having a frusto-conical inner surface, a clamping sleeve, a shaft, said sleeve being inserted in said inner race and secured on said shaft, said sleeve having an outer frusto-conical surface nested in said frusto-conical surface of said inner race, said sleeve having an externally threaded cylindrical extension, said extension having a longitudinal slot formed therein, a flat annular securing ring disposed on said extension, said ring having an inwardly radially extending lug engaged in the slot in said extension to prevent rotation of the ring thereon, said ring having an outwardly extending lug, said ring being formed of bendable shape-retaining material, and a clamping nut threaded on said extension, said nut having a flat inner face abutting said ring, said nut having an outer face formed with successive notches and detents for engaging a turning tool on the nut, said outer face of the nut being further formed with a circular groove and spaced inner and outer annular flanges so that the nut is U-shaped in cross-section with the bight portion abutting said ring, the outwardly extending lug of said ring being extensible over said outer annular flange with a portion engaged in one of said notches between a pair of adjacent detents to prevent the nut from turning on said extension, the free end portion of said outwardly extending lug terminating in said circular groove, whereby the nut is removable from said extension only by straightening said outer lug to disengage it from said clamping nut.

References Cited in the file of this patent

UNITED STATES PATENTS

| | | |
|---|---|---|
| 1,505,431 | Rollins | Aug. 19, 1924 |
| 2,043,272 | Wallgren | June 9, 1936 |
| 2,147,787 | Ferguson | Feb. 21, 1939 |

FOREIGN PATENTS

| | | |
|---|---|---|
| 417,398 | Great Britain | Oct. 4, 1934 |
| 664,939 | Great Britain | Jan. 16, 1952 |